(12) United States Patent
Desmarais

(10) Patent No.: US 8,070,178 B2
(45) Date of Patent: Dec. 6, 2011

(54) PROTECTIVE SAFETY COVER FOR THE PIN BOX AND THE KING PIN OF A FIFTH WHEEL TYPE TRAILER

(76) Inventor: Andre Desmarais, Racine (CA)

(*) Notice: Subject to any disclaimer, the term of this patent is extended or adjusted under 35 U.S.C. 154(b) by 0 days.

(21) Appl. No.: 12/697,194

(22) Filed: Jan. 29, 2010

(65) Prior Publication Data

US 2011/0187079 A1    Aug. 4, 2011

(30) Foreign Application Priority Data

Feb. 9, 2009   (GB) .................................. 0901942.3

(51) Int. Cl.
*B60D 1/60* (2006.01)
(52) U.S. Cl. ........................................ 280/507; 150/166
(58) Field of Classification Search .................. 280/507; 293/142
See application file for complete search history.

(56) References Cited

U.S. PATENT DOCUMENTS

| | | |
|---|---|---|
| 5,037,122 A | 8/1991 | Beckerer |
| 5,533,743 A | 7/1996 | Bello |
| 5,536,031 A | 7/1996 | Hurley |
| 5,560,631 A | 10/1996 | Salvo |
| 5,791,677 A | 8/1998 | Froehlich |
| 5,961,140 A | 10/1999 | Huskey |
| 6,322,094 B1 | 11/2001 | Poe |
| 6,913,278 B1 | 7/2005 | Laska |
| 7,014,205 B1 * | 3/2006 | Reilly .................. 280/507 |
| 2007/0235983 A1 | 10/2007 | Braun |

* cited by examiner

*Primary Examiner* — Tony H. Winner

(57) ABSTRACT

A protective safety cover for fifth wheel pin has a main panel having at least one edge, and an opening adapted to receive the king pin of the trailer therethrough; a perimeter wall extending perpendicularly to the at least one edge of the main panel; and a retainer member connected to the main panel and adapted to securely and removably attach the safety cover to the goose neck of the trailer and around the king pin, to thereby surround the king pin and protect a person from accidentally hitting the king pin.

7 Claims, 3 Drawing Sheets

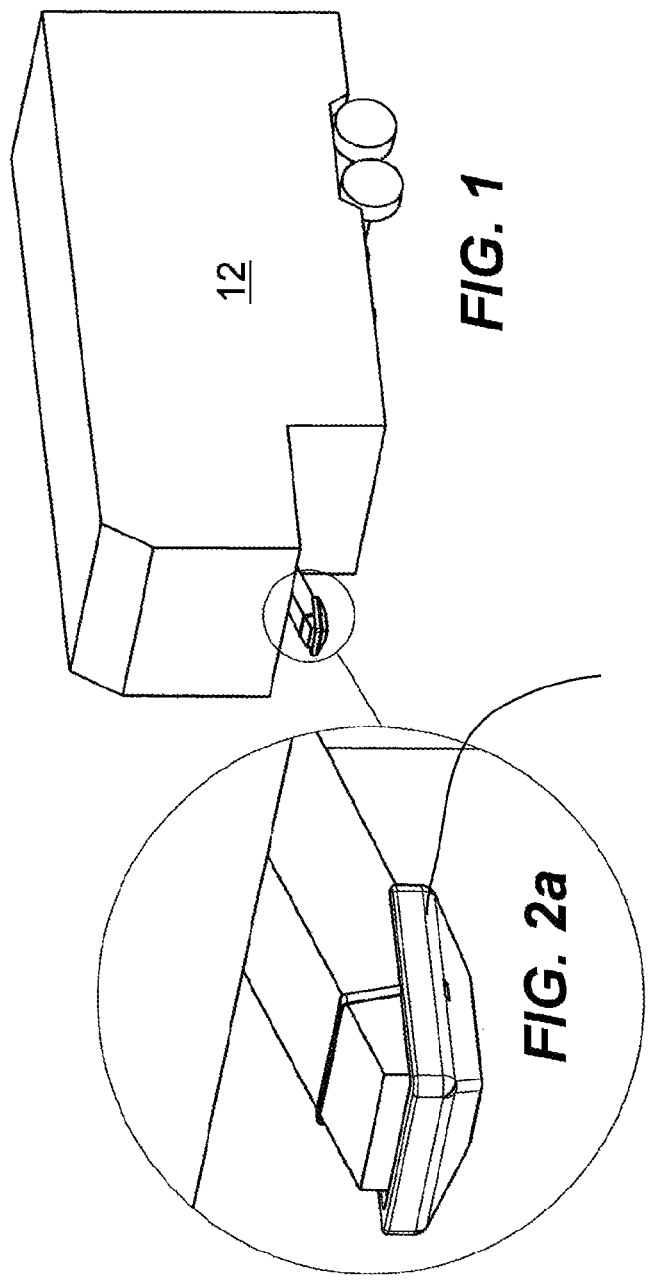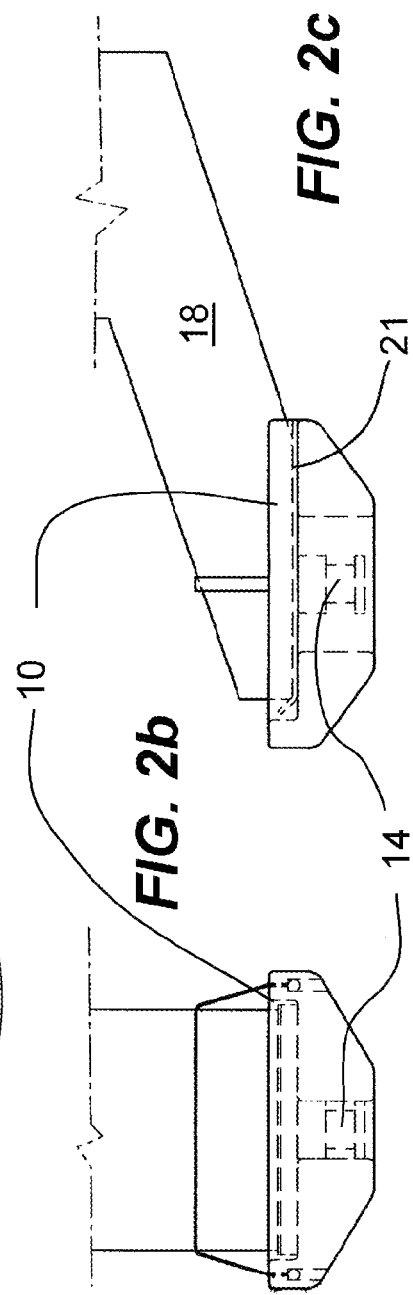

PROTECTIVE SAFETY COVER FOR THE PIN BOX AND THE KING PIN OF A FIFTH WHEEL TYPE TRAILER

This application claims priority based on request GB0901942.3 filed Jul. 2, 2009

FIELD OF THE INVENTION

The present invention relates generally to trailers but more particularly to a protective cover for the pin box and the king pin of a fifth wheel type trailer, for preventing injury to someone from accidental contact with the pin box and/or the king pin.

BACKGROUND OF THE INVENTION

Fifth wheel trailers have been in use for decades. They are usually hooked onto the saddle of a hitch located in the flatbed of a pickup truck. When a fifth wheel trailer is unhooked from its towing vehicle and parked, the protruding pin box and king pin that hook into the saddle are exposed and someone may hurt himself if colliding with them. This represents a risk of serious injuries to someone circulating around the unhooked trailer.

SUMMARY OF THE INVENTION

It is a main advantage of this invention to provide for a protective cover that eliminate any risk of injury when colliding with the king pin and/or with the pin box.

In order to do so, the invention comprises a main panel having at least one edge, and an opening adapted to receive the king pin of the trailer therethrough; a perimeter wall extending perpendicularly to the at least one edge of the main panel; and a retainer member connected to the main panel and adapted to securely and removably attach the safety cover to the pin box of the trailer and around the king pin, to thereby surround the king pin and the pin box and protect a person from accidentally hitting the king pin and/or pin box.

In a preferred embodiment, the main panel has a rectangular shape.

The perimeter wall extends around three edges of the main panel.

The opening has an oblong shape.

The retainer member is elongated and has opposite attachment ends that are adapted to connect to the main panel at two separate attachment points.

The attachment points are formed as channels; and the attachment ends include channel connectors, such that the channel connectors are removably secured to respective channels and thereby the retainer member is removably secured to the main panel.

The channel members are formed within the at least one edge.

The main panel has a thickness adapted to be at least as great as the length of the king pin of the trailer, such that the safety cover is capable of surrounding the entire king pin and protect a person from accidentally hitting the king pin.

The main panel is formed from a material chosen from a list of materials including elastomers and synthetic resins.

The retainer member is formed from a list of materials that includes elastomers, and hook and pile.

In an embodiment, the combination of a trailer and a protective safety cover for use upon a pin box and king pin of the trailer, the trailer including a pin box having one end attached to the trailer and extending outwardly therefrom, a coupling plate located at a distal end of the pin box and opposite from the one end, and a king pin attached to the coupling plate; the safety cover comprising a main panel having at least one edge, and an opening adapted to receive the king pin of the trailer therethrough; a perimeter wall extending perpendicularly to the at least one edge of the main panel; and a retainer member connected to the main panel and adapted to securely and removably attach the safety cover to the pin box of the trailer and around the king pin, to thereby surround the king pin and protect a person from accidentally hitting the king pin.

The coupling plate has a rectangular shape; and the main panel has a corresponding rectangular shape that is adapted to fit around the edges of the coupling plate.

The perimeter wall extends around three edges of the main panel, such that when the main panel is fit around the edges of the coupling plate the main panel can only move parallel in one direction with respect to the coupling plate.

The opening has an oblong shape, such that the opening can receive the king pin when the king pin is located at varying positions upon the coupling plate.

The retainer member is elongated and has opposite attachment ends that are adapted to connect to the main panel at two separate attachment points, such that the main panel and retainer member can be removably secured around the pin box and king pin.

The attachment points are formed as channels; and the attachment ends include channel connectors, such that the channel connectors are removably secured to respective channels and thereby the retainer member is removably secured to the main panel.

The channel members are formed within the at least one edge.

The main panel has a thickness adapted to be at least as great as the length of the king pin of the trailer, such that the safety cover is capable of covering and surrounding the entire king pin and the lower part of the pin box so as to protect a person from accidentally hitting the king pin and/or the pin box.

The main panel is formed from a material chosen from a list of materials including elastomers and synthetic resins.

The retainer member is formed from a list of materials that includes elastomers, and hook and pile.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIG. 1 Isometric view of a fifth wheel trailer.

FIG. 2a-c Iso, front and side views, respectively, of the invention.

DETAILED DESCRIPTION OF THE PREFERRED EMBODIMENT

Figure 3A:
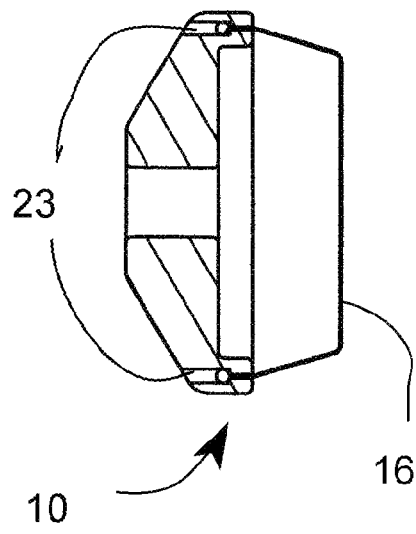
FIG. 3a-d Cutaway side, top, iso and reverse iso of the invention.
Figure 3B:
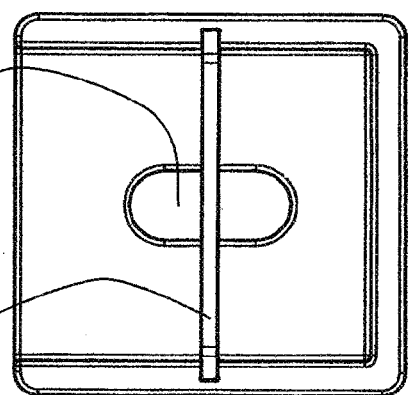
Figure 3C:
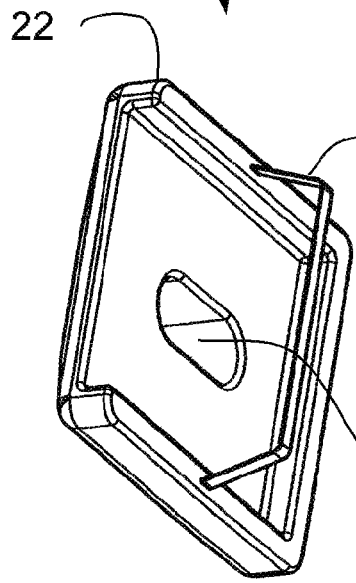
Figure 3D:
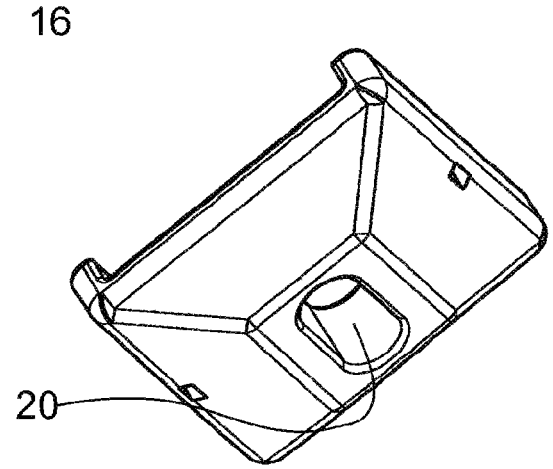
Figure 4A:
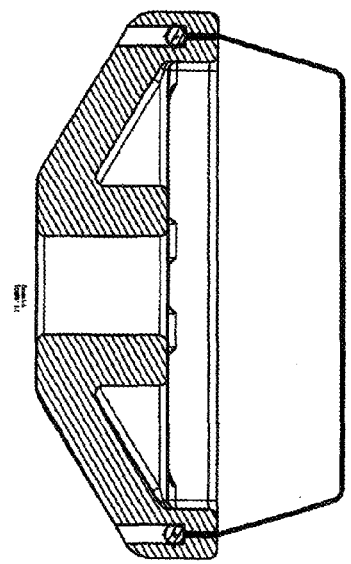
FIG. 4a-d Cutaway side, top, iso and reverse iso of the invention.
Figure 4B:
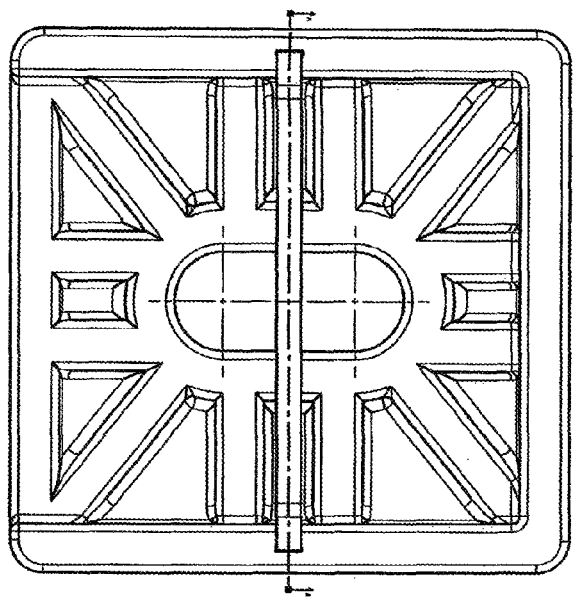
Figure 4C:
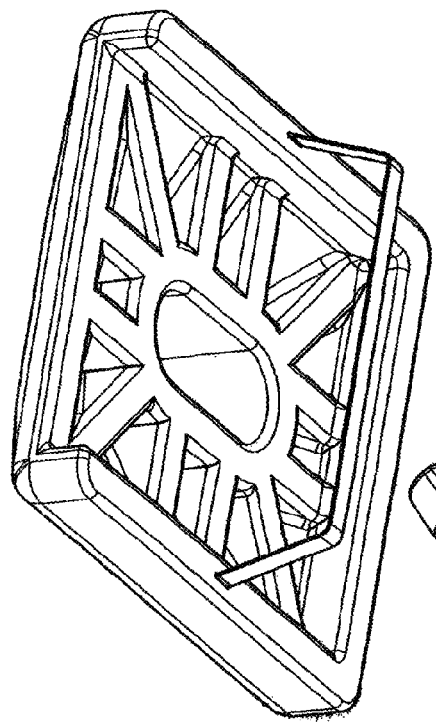
Figure 4D:
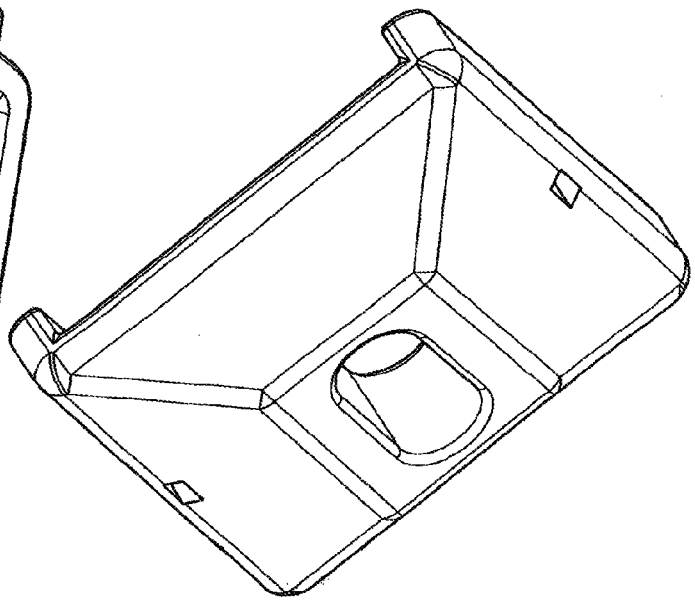

A protective safety cover (10) for a king pin and a pin box generally used on a fifth wheel trailer (12) has a retainer member (16) that is slipped over a pin box (18) onto which the king pin (14) is located.

Once the protective safety cover (10) installed, the king pin (14) is encased inside an oblong opening (20). The opening (20) is oblong so as to make it universal, since the king pin (14) can be located at different places on a coupling plate (21), depending upon the manufacturer of the pin box (18). A perimeter (22) limits the range of motion of the protective safety cover (10) on three sides once it is installed onto the pin box (18).

The retainer member (16) can be elastic in nature or made out of a hook and pile fastener. The retainer member (16) is anchored to the protective safety cover (10) by way of channels (23). The protective safety cover can be made from any of a variety of elastomers or synthetic resins.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A protective safety cover for use upon a pin box and king pin of a trailer, said safety cover comprising a main panel having at least one edge, and an opening adapted to receive said king pin of said trailer therethrough; a perimeter wall extending perpendicularly to said at least one edge of said main panel; and a retainer member connected to said main panel and adapted to securely and removably attach said safety cover to said pin box of said trailer and around said king pin and said pin box, to thereby surround said king pin and protect a person from accidentally hitting said king pin and said pin box;

said main panel has a rectangular shape;

said perimeter wall extends around three edges of said main panel;

said opening has an oblong shape;

said retainer member is elongated and has opposite attachment ends that are adapted to connect to said main panel at two separate attachment points;

said attachment points are formed as channels; and said attachment ends include channel connectors, such that said channel connectors are removably secured to respective channels and thereby said retainer member is removably secured to said main panel.

2. The protective safety cover of claim 1, wherein said channel members are formed within said at least one edge.

3. The protective safety cover of claim 1, wherein said main panel has a thickness adapted to be at least as great as the length of said king pin of said trailer, such that said safety cover is capable of covering said king pin and a lower part of the pin box and protect a person from accidentally hitting said king pin;

said main panel is formed from a material chosen from a list of materials including elastomers and synthetic resins;

said retainer member is formed from a list of materials that includes elastomers, and hook and pile.

4. A combination of a trailer and a protective safety cover for use upon a pin box and king pin of said trailer, said trailer including a pin box having one end attached to said trailer and extending outwardly therefrom, a coupling plate located at a distal end of said pin box and opposite from said one end, and a king pin attached to said coupling plate; said safety cover comprising a main panel having at least one edge, and an opening adapted to receive said king pin of said trailer therethrough; a perimeter wall extending perpendicularly to said at least one edge of said main panel; and a retainer member connected to said main panel and adapted to securely and removably attach said safety cover to said pin box of said trailer and around said king pin and said pin box, to thereby cover said king pin and a lower part of said pin box and protect a person from accidentally hitting said king pin;

said coupling plate has a rectangular shape; and said main panel has a corresponding rectangular shape that is adapted to fit around the edges of said coupling plate;

said perimeter wall extends around three edges of said main panel, such that when said main panel is fit around said edges of said coupling plate the main panel can only move parallel in one direction with respect to said coupling plate;

said opening has an oblong shape, such that said opening can receive said king pin when said king pin is located at varying positions upon said coupling plate;

said retainer member is elongated and has opposite attachment ends that are adapted to connect to said main panel at two separate attachment points, such that said main panel and retainer member can be removably secured around said pin box and king pin; said attachment points are formed as channels; and said attachment ends include channel connectors, such that said channel connectors are removably secured to respective channels and thereby said retainer member is removably secured to said main panel.

5. The protective safety cover of claim 4, wherein said channel members are formed within said at least one edge.

6. The protective safety cover of claim 4, wherein said main panel has a thickness adapted to be at least as great as the length of said king pin of said trailer, such that said safety cover is capable of covering the entire said king pin and said lower part of said pin box and protect a person from accidentally hitting said king pin.

7. The protective safety cover of claim 4, wherein said main panel is formed from a material chosen from a list of materials including elastomers and synthetic resins;

said retainer member is formed from a list of materials that includes elastomers, and hook and pile.

* * * * *